(12) United States Patent
Gangwal et al.

(10) Patent No.: US 7,725,681 B2
(45) Date of Patent: May 25, 2010

(54) PARALLEL PROCESSING ARRAY

(75) Inventors: Om Prakash Gangwal, Eindhoven (NL); Anteneh Alemu Abbo, Eindhoven (NL); Richard Petrus Kleihorst, Eindhoven (NL)

(73) Assignee: NXP B.V., Eindhoven (NL)

( * ) Notice: Subject to any disclaimer, the term of this patent is extended or adjusted under 35 U.S.C. 154(b) by 401 days.

(21) Appl. No.: 10/568,013

(22) PCT Filed: Aug. 3, 2004

(86) PCT No.: PCT/IB2004/051372

§ 371 (c)(1),
(2), (4) Date: Feb. 10, 2006

(87) PCT Pub. No.: WO2005/017765

PCT Pub. Date: Feb. 24, 2005

(65) Prior Publication Data

US 2006/0253516 A1    Nov. 9, 2006

(30) Foreign Application Priority Data

Aug. 15, 2003    (EP) ................................. 03102550

(51) Int. Cl.
*G06F 15/80* (2006.01)
(52) U.S. Cl. ........................ 712/22; 711/220
(58) Field of Classification Search ............ 712/20, 712/22; 711/220
See application file for complete search history.

(56) References Cited

U.S. PATENT DOCUMENTS

| | | | | |
|---|---|---|---|---|
| 4,025,771 A | * | 5/1977 | Lynch et al. | 708/521 |
| 5,537,562 A | * | 7/1996 | Gallup et al. | 712/234 |
| 5,581,777 A | * | 12/1996 | Kim et al. | 712/16 |
| 5,689,677 A | * | 11/1997 | MacMillan | 711/106 |
| 5,729,758 A | | 3/1998 | Inoue et al. | |
| 6,272,615 B1 | * | 8/2001 | Li et al. | 711/220 |
| 6,446,191 B1 | | 9/2002 | Pechanek et al. | |
| 2001/0054126 A1 | | 12/2001 | Fukuda et al. | |

FOREIGN PATENT DOCUMENTS

| | | |
|---|---|---|
| DE | 101 59 283 A1 | 6/2003 |
| EP | 0 638 868 A2 | 2/1995 |
| JP | 61-231657 A | 10/1986 |
| JP | 8-30577 A | 2/1996 |

OTHER PUBLICATIONS

Kleihorst et al., "Xetal: A Low-Power High-Performance Smart Camera Processor", ISCAS 2001, Proceedings of the 2001 IEEE International Symposium on Circuits and Systems, Sydney, Australia, May 6-9, 2001, pp. 215-218.*

(Continued)

*Primary Examiner*—William M Treat

(57) ABSTRACT

A processing element (1) forming part of a parallel processing array such as SIMD comprises an arithmetic logic unit (ALU) (3), a multiplexer (MUX) (5), an accumulator (ACCU) (7) and a flag register (FLAG) (9). The ALU is configured to operate on a common instruction received by all processing elements in the processing array. The processing element (1) further comprises a storage element (SE) (11), which supports the processing of local customized (i.e. data dependent) processing in the processing element (1), such as lookup table operations and the storing local coefficient data.

32 Claims, 2 Drawing Sheets

OTHER PUBLICATIONS

Blevins et al., "Blitzen: A Highly Integrated Massively Parallel Machine", Frontiers of Massively Parallel Computation, 1988, Proceedings, Oct. 10-12, 1988, pp. 399-406.*

Dahle et al. "Kestrel: Design of an 8-bit SIMD parallel processor." *Proc. 17th Conf. on Advanced Research in VSLI.* Sep. 15-17, 1997, 18 pgs.

Okazaki et al. "Integrated Memory Array Processor and Real-Time Vision System for Vehicle Control." *Vehicle Navigation and Information Systems Conference,* Aug. 31-Sep. 2, 1994, pp. 103-106.

* cited by examiner

PARALLEL PROCESSING ARRAY

The invention relates to a parallel processing array, for example a single instruction multiple data (SIMD) processing array, having a plurality of processing elements (PEs). In particular, the present invention relates to a parallel processing array which is adapted to improve the efficiency of the array when handling data dependent processing operations.

In a SIMD processing array, each processing element (PE) in the array receives the same instruction via a common instruction stream, and executes the instruction based on local data which is unique to that processing element. Parallel processing arrays are therefore well suited to performing highly repetitive tasks where the same operations are performed on multiple data at the same time, such as those associated with image processing. SIMD therefore provides an area efficient, scalable, low power implementation. While SIMD is suited to applications which involve significant repetition in the data and the processing of the data, SIMD is not so suited for performing data dependent processing operations.

For example, in video processing (e.g. deinterlacing, noise reduction, horizontal dynamic peaking) most of the operations are exactly the same for all data elements in the array, and therefore make efficient use of the SIMD array. However, data dependent processing operations, such as look-up table operations or multiplication with different coefficients based on the location of data in an array, do not make efficient use of a SIMD processing array.

Figure 1:
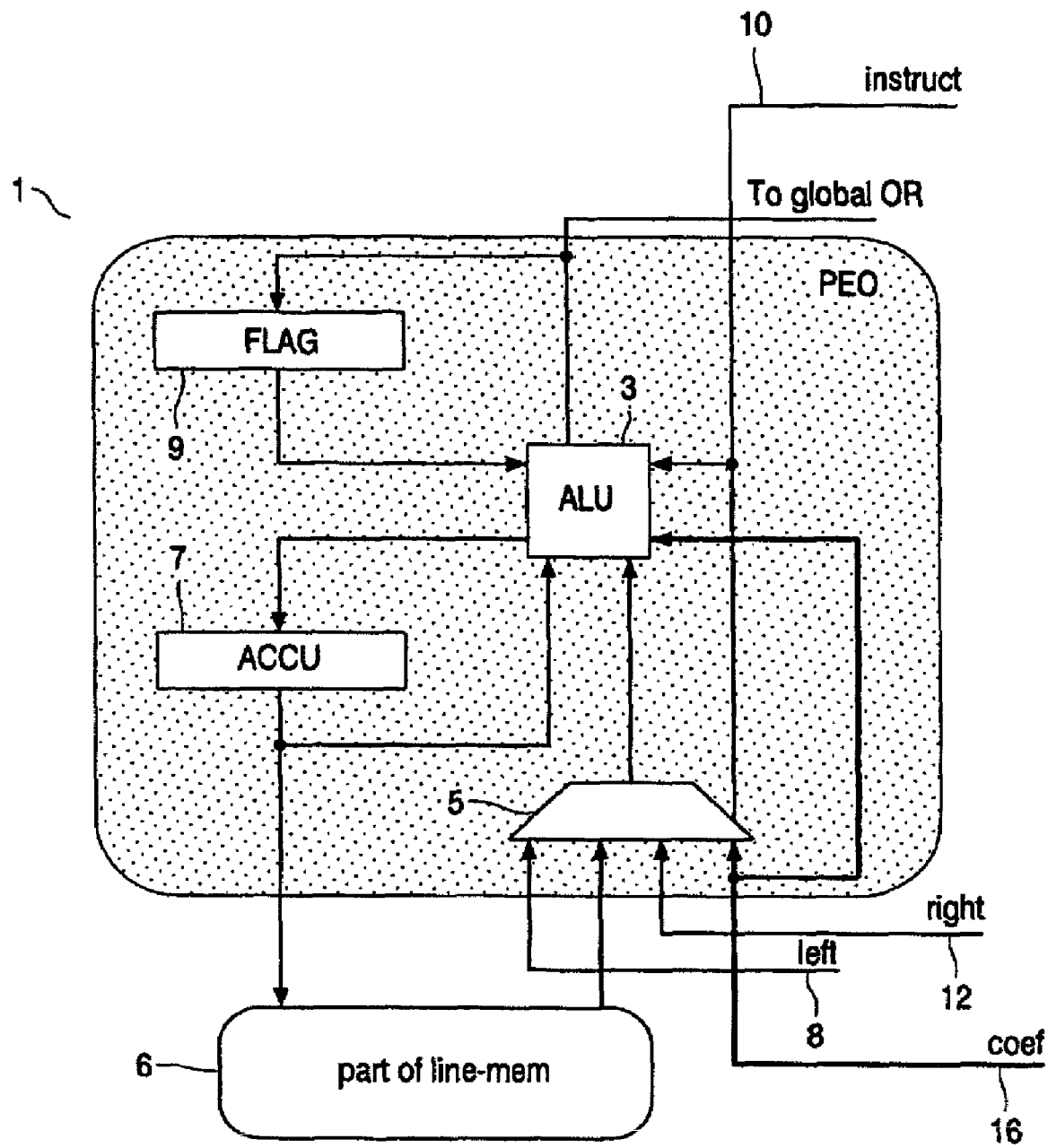

FIG. 1 shows a schematic of a typical processing element (PE) 1 in a Xetal SIMD processing architecture (Xetal being a low power parallel processor for digital video cameras). The processing element 1 comprises an arithmetic logic unit (ALU) 3, a multiplexer (MUX) 5, an accumulator (ACCU) 7 and a flag register (FLAG) 9. The processing element 1 receives a broadcast instruction 10, which will be received by all other processing elements in the array (not shown). The ALU 3 processes the instruction 10 based on local data. The accumulator 7 is provided for storing a last result, which can be used as the operand for the next instruction 10. Typically, the ALU 3 comprises an adder and a multiplier, thereby enabling comparisons, addition, subtraction, data weighting and multiply-accumulate operations to be performed within one clock cycle. Typically, the flag register 9 contains a 1-bit flag which is set according to the last result. Based on this flag status conditional pass-instructions are possible, allowing a limited form of data dependency in the algorithms.

It is noted that the multiplexer 5 is controlled by the broadcast instruction 10. In the Xetal architecture, the multiplexer 5 receives a number of input signals which are selectively connected to the ALU 3. For example, the multiplexer 5 receives data from part of the line memory 6, and data from left and right communication channels 8, 12. The multiplexer 5 also receives coefficient data (coeff) 16. In this manner, the ACCU signal 14 from the accumulator 7 is used as one operand for an operation, and the multiplexer 5 selects the second operand. Therefore, the second operand can be selected from the left communication channel 8, the right communication channel 12 or the line memory 6, or a "fixed" number from the coefficient input 16.

In this kind of processor, performing data dependent processing, for example retrieving a value from a look-up table, or performing different operations with different data elements of the same array, are either not possible or require many long and complicated iterations. This results in poor efficiency of the SIMD processing array.

For example, performing a multiplication after retrieving a value from a look-up table of ten elements requires forty operations in the Xetal architecture shown in FIG. 1. An implementation using the Xetal instruction set is shown below, in which, for a look-up, the value has to be compared to a lower limit:

Assume r0 has the data elements of a desired array.
1. accu=r0; -move the data to the accumulator
2. accu=MAX(accu, lower_limit0); -find max of r0 and lower_limit0 and store in accu
3. accu=accu*coeff0; -this is the operation in the interval
4. r1=PASSC(accu,r1); -if r0 was in the region keep the result, otherwise copy r1 to the next interval As shown above, for all entries in the look-up table (LUT), for example ten in the example provided above, all four of the above operations must be performed. This means that for a ten element LUT, forty operations are required.

The aim of the present invention is to provide a parallel processing array that does not suffer from the disadvantages mentioned above, when processing data dependent operations.

According to a first aspect of the present invention, there is provided a parallel processing array comprising a plurality of processing elements (PEs), each processing element receiving a common instruction and comprising:
a multiplexer for receiving said common instruction;
an arithmetic logic unit, connected to said multiplexer, for processing the received instruction in association with an accumulator and a flag register; characterized in that one or more of the processing elements in the processing array further comprises a storage element having at least one storage location, the storage element configured to be indirectly addressable by the received instruction, thereby enabling the processing of data dependent operations to be performed.

The processing array defined above has the advantage of being more efficient than a conventional processing array when performing data dependent processing operations.

According to another aspect of the present invention, there is provided a method of processing data in a parallel processing array comprising a plurality of processing elements (PEs), each processing element receiving a common instruction and comprising a multiplexer for receiving said common instruction, and an arithmetic logic unit, connected to said multiplexer, for processing the received instruction in association with an accumulator and a flag register, the method comprising the steps of:
providing a storage element in one or more of the processing elements in the processing array, the storage element having at least one storage location;
configuring the storage element to be indirectly addressable by the received instruction; and
processing data dependent operations using the storage element.

Figure 2:
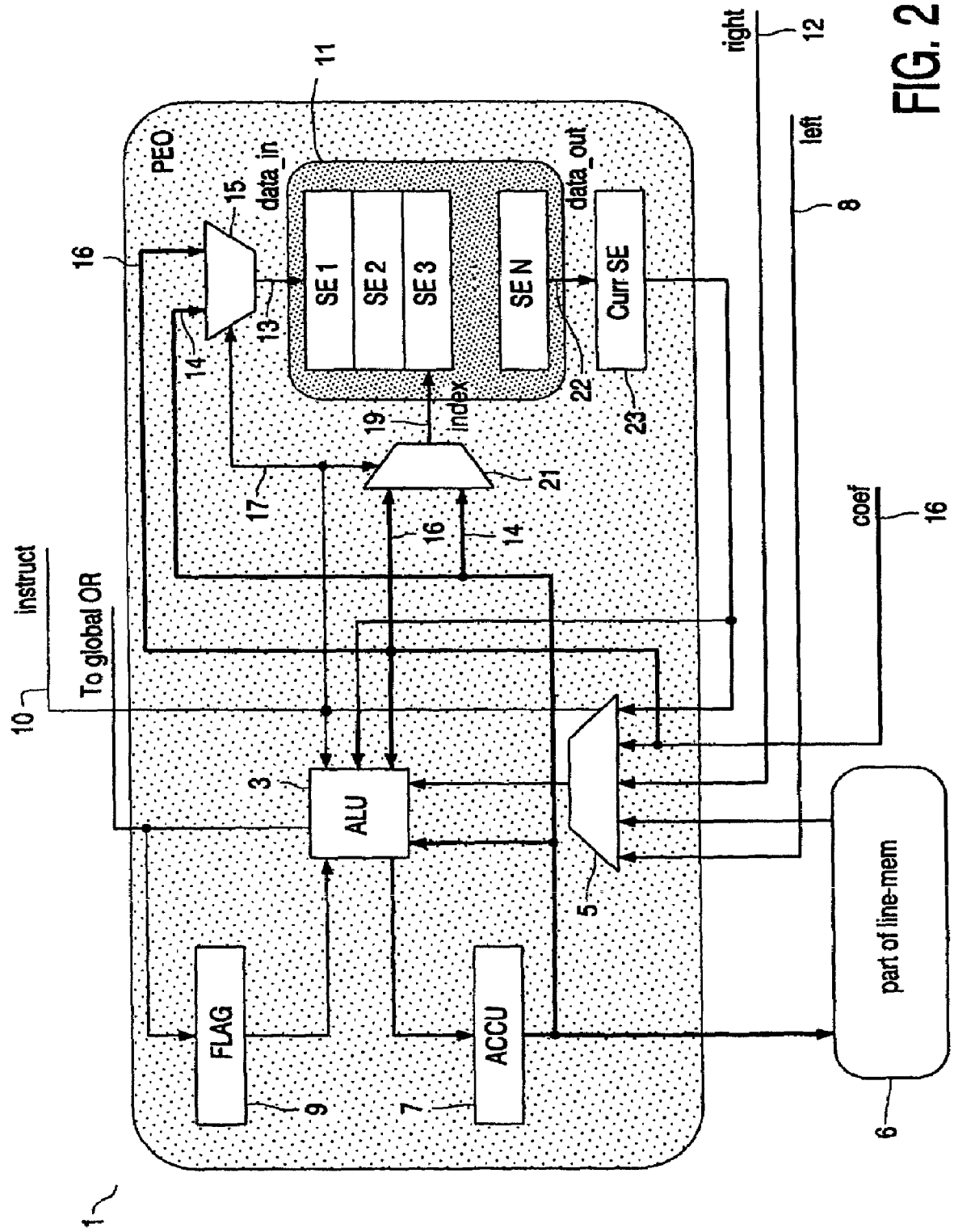

For a better understanding of the present invention, and to show more clearly how it may be carried into effect, reference will now be made, by way of example, to the accompanying drawings, in which:

FIG. 1 shows a schematic diagram of a processing element of a parallel processing array according to the prior art; and FIG. 2 shows a schematic diagram of a processing element of a parallel processing array according to the present invention.

FIG. 2 shows a processing element 1 of a processing array according to the present invention. As shown in FIG. 1 above, the processing element 1 comprises an arithmetic logic unit (ALU) 3, a multiplexer (MUX) 5, an accumulator (ACCU) 7 and a flag register (FLAG) 9. The operation of these elements for "conventional" processing, i.e. non-data dependent processing, is the same as that described above in relation to FIG. 1.

According to the invention, the processing element further comprises a storage element (SE) 11, which supports the processing of local customized (i.e. data dependent) processing in the processing element 1.

The storage element 11 comprises a number of storage locations $SE_1$ to $SE_N$. The number of storage locations are selected in the design process depending on the particular application, and can be any integer value. The storage element 11 receives input data 13 (data_in) via a multiplexer 15. The multiplexer 15 is connected to receive accumulator data 14 from the output of the accumulator 7, and coefficient data 16 (coeff) from a coefficient port of the processing element 1. The multiplexer 15 is arranged to selectively provide the accumulator data 14 or coefficient data 16 as the input data 13 to the storage element 11, under control of a control signal 17, which comes from or forms part of the broadcast instruction 10.

The storage element 11 also receives an index signal 19, which is connected to the output of a multiplexer 21. The multiplexer 21 is also connected to receive accumulator data 14 from the accumulator 7, and coefficient data 16 (coeff) from the coefficient port of the processing element 1. The multiplexer 21 is also controlled by the control signal 17, which comes from or forms part of the broadcast instruction 10. Output data 22 (data_out) from the storage element 11 is connected to the input of the multiplexer 5 of the processing element 1. Preferably, a register 23 (curr_se) is provided between the output of the storage element 11 and the multiplexer 5, which can be used for storing a value of the storage element 11, as will be described in greater detail later in the application.

Next, the operation of the embodiment of FIG. 2 will be described in relation to storing different coefficients in each PE to provide multiplication (or any other operation) with a different coefficient per data in the array, and the performing of a look-up table operation, though the instruction used for all PEs remains the same.

When the storage element 11 is used for storing different coefficients, the coefficient data 16 is used as an index for the storage element table, and the accumulator data 14 from the accumulator 7 or line memory is stored at a corresponding storage location $SE_Y$ in the storage element 11. In other words, the multiplexer 15 is controlled to pass the accumulator data 14 as the input data 13 to the storage element 11, while the multiplexer 21 is controlled to pass the coefficient data 16, which acts as the index 19 to the respective storage location $SE_Y$ in which the data is to be stored. This enables the correct values to be stored in the correct locations $SE_1$-$SE_N$ in the storage element 11. Alternatively, if desired, the coefficients can be stored by applying the coefficient data to the input 13 and using the accumulator data as the index 19.

When loading a value from the storage element 11, in a similar manner to the above, the coefficient data 16 is used as an index 19 to make a value from the respective storage location of the storage element 11 available at the output, thereby enabling multiplication with the data in the accumulator 7 to be performed. In other words, when loading data from the storage element 11, the multiplexer 21 is arranged to pass the coefficient data 16 as the index 19 for the storage element 11, thereby outputting the respective output data 22 from the storage element 11. The output data from the storage element 11 is passed via the multiplexer 5 to the ALU 3, for multiplication with the data from the accumulator 7.

When using the storage element as a look-up table (LUT) in each PE, there are a number of alternative approaches for storing the correct values (lower_limit, resultant value) in the storage element 11.

One approach is to use a part of the coef input as the index, and the other part as the value to be stored. In other words, part of the coefficient data 16 is passed by the multiplexer 21 as the index 19 for the storage element 11, while the other part of the coefficient data 16 is passed by multiplexer 15 as the value to be stored. Although this method has the disadvantage of increasing the width of the coefficient data signal, it has the advantage of storing values in one cycle.

Another approach is to generate the address or index 19 with the help of the accumulator 7 and/or the ALU 3, which enables generation of different addresses and in turn enabling the same values to be stored at different locations in storage elements of PEs, by applying that address to the storage element 11 with a store instruction, such that the value of the coefficient data 16 is stored in the respective storage location $SE_Y$ of the storage element 11. In this arrangement, the multiplexer 15 is arranged to pass the coefficient data 16, while the multiplexer 21 provides an index 19 which has been generated by the accumulator 7 and/or ALU 3. This approach has the advantage of requiring a narrower coefficient data signal, but has the disadvantage of requiring one extra processing operation.

For loading a value from the storage element 11, the value of the accumulator 7 is used as the index 19, and the looked up value from the storage element 11 is stored in the register 23 (curr_se) for further use. In other words, the accumulator data 14 from the accumulator 7 is passed by the multiplexer 21 to provide an index 19 for the storage element 11. The corresponding value from the respective storage location $SE_Y$ forms the output data 22 of the storage element 11, and is either passed directly to the multiplexer 5, or stored in the register 23 for later use. It is noted that, when running at low frequency the register 23 (curr_se) can be bypassed to perform operations in one cycle.

The invention described above provides an improved processor array, since it enables the processing elements to operate in any of the following ways:
a) every PE executes the same operation based on a broadcast instruction, (i.e. "normal" operation)
b) a PE uses a different coefficient based on the data to be processed to execute the same broadcast instruction, or
c) the PE executes a function that has been described in a look-up table upon a broadcast for all PEs to do LUT operations.

In a video processing application, for example, most of the functions can be performed on line based processing (for example, deinterlacing, noise reduction, horizontal dynamic peaking) or can be expressed in terms of line based processing (for example, an upconverter with 2×2 block size can be processed on line basis by accumulating 2×2 blocks as two lines and performing line based processing). This means that most operations are exactly the same for all data elements in the array, and can therefore be performed using the "normal" PE operation described above in (a).

However, when performing tasks such as multiplication (or other operands) with different coefficients based on location of data in an array, the processing element according to the present invention is configured to operate as described in (b) above.

Likewise, for LUT operation, the processing element is configured to operate as described in (c) above.

The invention has the advantage of utilizing the properties of SIMD processing, yet providing a more efficient operation when data dependent processing operations are to be performed. For example, the processing of a multiplication with a looked up value in the present invention would take around two operations (depending on the implementation choice for LUT operation), which is about only 5% of the earlier described method which needed forty instructions.

The invention therefore provides an indirectly addressable memory per processing element, which can be used for data dependent operations such as look-up table operations and accessing different coefficients that can be used with the same instruction for all PEs.

It is noted that the increased area required for a processing element due to the storage element is not a detrimental factor, since the interconnection area is the dominating factor on a chip like this. Thus, placing the storage elements near the arithmetic logic unit (ALU) avoids further overloading of the communication network (i.e. wiring overhead).

Although the preferred embodiment has been described in relation to video processing, it will be appreciated by a person skilled in the art that the processing element according to the present invention can also be used for other functions.

Furthermore, although the preferred embodiment has been described in relation to the Xetal architecture, the invention is equally applicable to other forms of parallel processing architecture.

The invention claimed is:

1. A parallel processing array comprising a plurality of processing elements (PEs), each processing element configured for a common instruction and comprising: a multiplexer for receiving a control signal representing at least a portion of said common instruction; an arithmetic logic unit, connected to said multiplexer, for processing the received instruction in association with an accumulator and a flag register; characterized in that one or more of the processing elements in the processing array further comprises a storage element having at least one storage location, the storage element configured to be indirectly addressable by the received instruction, thereby enabling the processing of data dependent operations to be performed.

2. A parallel processing array as claimed in claim 1, wherein the storage element comprises: an input data port for receiving data to be stored; an index signal for addressing a storage location in the storage element; and an output port for outputting data from the storage element.

3. A parallel processing array as claimed in claim 2, wherein the input data port of the storage element is connected to receive data from an input multiplexer, the input multiplexer being configured to pass accumulator data or coefficient data.

4. A parallel processing array as claimed in claim 2, wherein the index signal is received from an index multiplexer, the index multiplexer being configured to selectively pass accumulator data or coefficient data, according to a part of the received instruction.

5. A parallel processor as claimed in claim 3, wherein the input multiplexer and/or index multiplexer is controlled by the received instruction.

6. A parallel processing array as claimed in claim 1, wherein the storage element is configured to provide the processing element with a coefficient based on the data to be processed.

7. A parallel processing array as claimed in claim 6, wherein the input multiplexer is configured to pass accumulator data to the storage element.

8. A parallel processing array as claimed in claim 6, wherein the input multiplexer is configured to pass coefficient data to the storage element, stored in a storage location defined by the index signal.

9. A parallel processing array as claimed in claim 7, wherein the index signal is defined by coefficient data received by the index multiplexer.

10. A parallel processing array as claimed in claim 7, wherein the index signal is defined by accumulator data received by the index multiplexer.

11. A parallel processing array as claimed in claim 1, wherein the storage element is configured to provide a local look-up table for the processing element.

12. A parallel processing array as claimed in claim 11, wherein the input multiplexer is configured to pass coefficient data to the storage element for storage in a location defined by the index signal.

13. A parallel processing array as claimed in claim 12, wherein the index signal is defined by accumulator data received by the index multiplexer.

14. A parallel processing array as claimed in claim 11, wherein the input multiplexer is configured to pass a first part of the coefficient data as the data to be stored in the storage element, and the index multiplexer arranged to pass the other part of the coefficient data as the index signal defining the storage address.

15. A parallel processing array as claimed in claim 1, further comprising a register for storing data between the output of the storage element and the input of the multiplexer.

16. A parallel processing array as claimed in claim 1, wherein the processing array is a single instruction multiple data (SIMD) processing array.

17. A method of processing data in a parallel processing array comprising a plurality of processing elements (PEs), each processing element receiving a common instruction and comprising a multiplexer for receiving a control signal representing at least a portion of said common instruction, and an arithmetic logic unit, connected to said multiplexer, for processing the received instruction in association with an accumulator and a flag register, the method comprising the steps of: providing a storage element in one or more of the processing elements in the processing array, the storage element having at least one storage location; configuring the storage element to be indirectly addressable by the received instruction; and processing data dependent operations using the storage element.

18. A method as claimed in claim 17, further comprising the steps of:
providing an input data port in the storage element for receiving data to be stored;
providing an index signal for addressing a storage location in the storage element; and
providing an output port for outputting data from the storage element.

19. A method as claimed in claim 18, further comprising the steps of connecting the input data port of the storage element to receive data from an input multiplexer, and configuring the input multiplexer to pass accumulator data or coefficient data.

20. A method as claimed in claim 18, further comprising the step of providing an index multiplexer for providing the index signal, and configuring the index multiplexer to selectively pass accumulator data or coefficient data, according to a part of the received instruction.

21. A method as claimed in claim 19, further comprising the step of controlling the input multiplexer and/or index multiplexer with the received instruction.

22. A method as claimed in claim 17, further comprising the step of configuring the storage element to provide the processing element with a coefficient based on the data to be processed.

23. A method as claimed in claim 22, further comprising the step of configuring the input multiplexer to pass accumulator data to the storage element.

24. A method as claimed in claim 22, further comprising the step of configuring the input multiplexer to pass coefficient data to the storage element, and storing the coefficient data in a storage location defined by the index signal.

25. A method as claimed in claim 23, wherein the index signal is defined by coefficient data received by the index multiplexer.

26. A method as claimed in claim 23, wherein the index signal is defined by accumulator data received by the index multiplexer.

27. A method as claimed in claim 17, further comprising the step of configuring the storage element to provide a local look-up table for the processing element.

28. A method as claimed in claim 27, wherein the input multiplexer is configured to pass coefficient data to the storage element for storage in a location defined by the index signal.

29. A method as claimed in claim 28, wherein the index signal is defined by accumulator data received by the index multiplexer.

30. A method as claimed in claim 27, further comprising the step of configuring the input multiplexer to pass a first part of the coefficient data as the data to be stored in the storage element, and arranging the index multiplexer to pass the other part of the coefficient data as the index signal defining the storage address.

31. A method as claimed in claim 17, further comprising the step of providing a register for storing data between the output of the storage element and the input of the multiplexer.

32. A method as claimed in claim 17, wherein the processing array is a single instruction multiple data (SIMD) processing array.

\* \* \* \* \*